US010969769B2

(12) United States Patent
Menke

(10) Patent No.: US 10,969,769 B2
(45) Date of Patent: Apr. 6, 2021

(54) PLANNING SYSTEM AND METHOD FOR MAINTAINING A CYCLE TIME IN AN AUTOMOBILE FACTORY

(71) Applicant: Rexnord FlatTop Europe B.V., s-Gravenzande (NL)

(72) Inventor: Cornelis Hendrik Mijndert Menke, 's-Gravenzande (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 87 days.

(21) Appl. No.: 15/765,128

(22) PCT Filed: Oct. 3, 2016

(86) PCT No.: PCT/NL2016/050675
§ 371 (c)(1),
(2) Date: Mar. 30, 2018

(87) PCT Pub. No.: WO2017/058019
PCT Pub. Date: Apr. 6, 2017

(65) Prior Publication Data
US 2018/0284738 A1 Oct. 4, 2018

(30) Foreign Application Priority Data

Oct. 1, 2015 (NL) ...................................... 2015542

(51) Int. Cl.
*B62D 65/18* (2006.01)
*G05B 19/418* (2006.01)
(Continued)

(52) U.S. Cl.
CPC ....... *G05B 19/41865* (2013.01); *B62D 65/18* (2013.01); *B65G 35/02* (2013.01); *B65G 2201/0294* (2013.01); *Y02P 90/02* (2015.11)

(58) Field of Classification Search
CPC .. G05B 19/41865; B62D 65/18; B65G 35/02; B65G 2201/0294; Y02P 90/20
See application file for complete search history.

(56) References Cited

U.S. PATENT DOCUMENTS 3,608,745 A * 9/1971 Pohl ..................... B65G 17/002
198/465.1
3,658,590 A * 4/1972 Huebner .................. B60S 3/04
134/32
(Continued)

FOREIGN PATENT DOCUMENTS

| CN | 1189228 A | 7/1998 |
| CN | 102914263 A | 2/2013 |

(Continued)

OTHER PUBLICATIONS

The International Search Report for PCT International Patent Application No. PCT/NL2016/050675 dated of Dec. 13, 2016.
(Continued)

*Primary Examiner* — Michael D Masinick
(74) *Attorney, Agent, or Firm* — Quarles & Brady LLP

(57) ABSTRACT

An automobile factory planning system and method for controlling a cycle time. The system comprises a conveyor belt configured to transport a plurality of automobiles at a controlled displacement velocity along a manufacturing path through the automobile factory. A feedback device is configured to provide a visual indicator of a designated position at which a next automobile is to be placed on the conveyor belt relative to the position of a previous automobile. The designated position is calculated as a function of the cycle time and the displacement velocity of the conveyor belt.

16 Claims, 3 Drawing Sheets

(51) Int. Cl.
*B65G 35/02* (2006.01)
*B65G 15/30* (2006.01)

(56) References Cited

U.S. PATENT DOCUMENTS

| | | | | |
|---|---|---|---|---|
| 4,639,878 A * | 1/1987 | Day | G01B 11/002 | 348/94 |
| 9,014,902 B1 * | 4/2015 | Murphy | G05D 1/0295 | 701/26 |
| 9,612,583 B1 * | 4/2017 | Qaddoura | G05B 19/128 | |
| 2002/0198618 A1 * | 12/2002 | Madden | G05B 19/41815 | 700/101 |
| 2004/0186618 A1 * | 9/2004 | Blaine | B26D 5/00 | 700/230 |
| 2006/0136085 A1 * | 6/2006 | Steinhilper | G05B 19/41865 | 700/111 |
| 2008/0190953 A1 * | 8/2008 | Mallett | B07C 7/005 | 221/13 |
| 2010/0256793 A1 * | 10/2010 | Lee | G05B 19/41875 | 700/108 |
| 2015/0160650 A1 * | 6/2015 | Scelsi | G05B 19/41805 | 700/99 |
| 2016/0288330 A1 * | 10/2016 | Konolige | G01B 11/24 | |
| 2019/0265044 A1 * | 8/2019 | Keene | A01B 69/008 | |

FOREIGN PATENT DOCUMENTS

| | | |
|---|---|---|
| CN | 103712555 A | 4/2014 |
| DE | 202 08 805 | 10/2003 |
| JP | 201199522 A | 7/2001 |

OTHER PUBLICATIONS

Vardachari, Ramesh: "Car Parking Conveyor Type 2", Youtube, Nov. 23, 2012 (Nov. 23, 2012), pp. 1-1, XP054976661.

Tommy Wash: "Tommy Car Wash "People Mover" 12' Belt Converyor", Youtube, Aug. 18, 2009 (Aug. 18, 2009), pp. 1-1, XP054976662.

* cited by examiner

PLANNING SYSTEM AND METHOD FOR MAINTAINING A CYCLE TIME IN AN AUTOMOBILE FACTORY

CROSS-REFERENCE TO RELATED APPLICATIONS

This application represents the national stage entry of PCT International Application No. PCT/NL2016/050675 filed Oct. 3, 2016 and claims priority to Dutch Patent Application No. NL 2015542 filed Oct. 1, 2015. The contents of these applications are hereby incorporated by reference as if set forth in their entirety herein.

STATEMENT REGARDING FEDERALLY SPONSORED RESEARCH OR DEVELOPMENT

Not applicable.

TECHNICAL FIELD AND BACKGROUND

The present disclosure relates to an automobile factory planning system, a feedback device for maintaining a cycle time, use of a modular conveyor mat in the planning system, a method for controlling a cycle time, and a computer readable medium to execute the method.

In industrial manufacturing, the 'takt time' (from the German Taktzeit) refers to the average unit production time needed to meet customer demand. The 'cycle time' refers to the time that elapses between two consecutive unit completions and determines the rate at which the production processes occur. Ideally, the cycle time is determined by a factory planning system as close as possible to the takt time to keep in line with customer demand.

In automobile manufacturing, cars are typically assembled on a long production line (conveyor belt) moving at a certain velocity past various work stations. The cycle time is determined by the velocity at which the conveyor belt moves relative to the work stations and the distance between the cars on the conveyor belt. For example, the cycle time determines the rate at which car chairs are supplied and the time available for mounting a steering wheel in the car. To prevent variation of the cycle time in consecutive cars it is important that the distance between the cars remains constant.

Customarily, cars are placed onto the start of the conveyor belt by personnel. To guide the personnel, the designated positions of consecutive cars can be indicated by "takt marking", e.g. painted as yellow lines on an otherwise black conveyor belt in accordance with the ideal cycle time interval (i.e. takt time). However, wear and tear of the conveyor belt may cause lengthening of the conveyor belt and thereby variations in the interval distance between the lines. Changes in the cycle time may be compensated by adjusting the velocity of the engines driving the conveyor belt. However, the electronics to adjust the velocity in such heavy systems is very costly.

Modern car factories use a conveyor belt consisting of modular conveyor mats that require relatively low maintenance and can be individually replaced in case of damage. Such a modular system has the advantage that any lengthening can be compensated by removing one or more rows of mats. However, when there are takt markings on the conveyor belt, care has to be taken that the same number of rows is removed between each of the takt markings to keep the cycle time constant. The number of rows that can be removed is thus at minimum equal to the number of takt markings. Until the lengthening is sufficient to remove this number of rows, the relatively large slack in the conveyor belt may be compensated by changing a position of one of the axles. However, such an adjustment mechanism is undesirable and, moreover, the removal of the mats between each of the takt markings is time consuming.

Accordingly, it is desirable to provide an improved planning system and method for an automobile manufacturing plant, wherein the disadvantages of known systems are alleviated.

SUMMARY

According to one aspect, the present disclosure provides an automobile factory planning system comprising a feedback device providing a virtual indicator of a designated position at which a next automobile is to be placed on a conveyor belt. The designated position is calculated as a function of the cycle time and the displacement velocity of the conveyor belt. Another or further aspect of the disclosure provides a specific feedback device comprising a display screen and camera. Another or further aspect of the disclosure provides a method for controlling a cycle time in an automobile factory by providing the visual indicator. The method may e.g. be carried out by executing program instructions stored on a computer readable medium.

By providing virtual feedback e.g. in the form of visual indicators instead of physical markings on the conveyor belt, the cycle time can be maintained at any desired interval independent of the physical characteristic of the conveyor belt. By calculating the position of the virtual markings as a function of the displacement of the conveyor belt, the marking interval is independent on the lengthening of the conveyor belt. For a modular conveyor belt this has the particular advantage that rows of conveyor modules can be easily removed anywhere and at any time to compensate for lengthening. Accordingly, the adjustment mechanism for compensating the large slack is no longer needed. Also, installment of a modular conveyor mat is much simpler without having to position the periodic markings. Accordingly, it will be appreciated that the present disclosure facilitates use of a modular conveyor mat as part of the conveyor belt in the automobile factory planning system as described herein.

Furthermore, it is not necessary to adjust the velocity of the conveyor belt, because the cycle time can be programmatically adjusted by changing the positions of the virtual markings. The cycle time can even be individually adjusted or for a specific series to take into account different vehicles. For example a distance between markings can be adjusted to a length of the vehicles. If necessary the velocity of the conveyor belt may compensate the different length to keep the same cycle time.

Virtual feedback markings can be shown from any position and may be more comprehensive for the driver placing the car than physical marks that are only on the conveyor belt. Preferably, the visual indicators are provided on a display screen. For example, the screen can be positioned at any position visible from the driver's seat. The screen may e.g. provide visual feedback whether the car is in the designated position. For example, a virtual marking can be displayed. By additionally showing a recorded image of the car that is being placed on the display screen, the driver can more clearly estimate the designated position. For example a virtual line is overlaid on the screen moving in sync with the displacement of the conveyor belt. The driver can move the car until the front end displayed on the screen reaches the virtual line. Alternatively, or in addition also other indicators can be provided on the screen to guide the driver. For example a part of the display may change color or provide other feedback when the driver places the car in the designated position. The virtual marking may also provide a width indicator to aid in centrally positioning the car on the conveyor belt.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
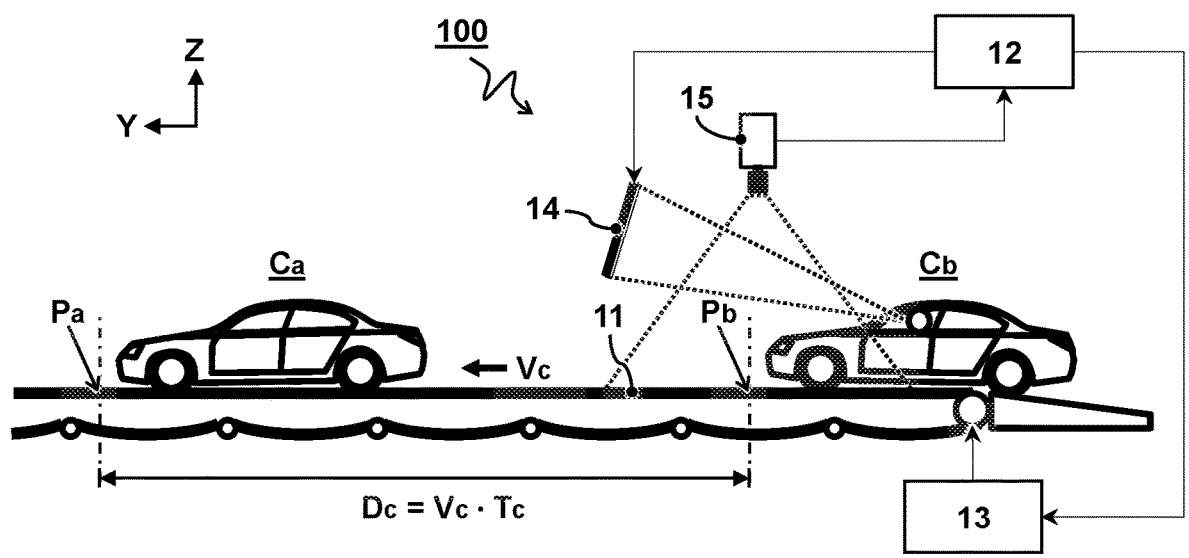
FIG. 1A shows a schematic side view of first embodiment of an automobile factory planning system.

The invention is described more fully hereinafter with reference to the accompanying drawings, in which embodiments of the invention are shown. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic illustrations of possibly idealized embodiments and intermediate structures of the invention. In the description and drawings, like numbers refer to like elements throughout. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

Figure 1B:
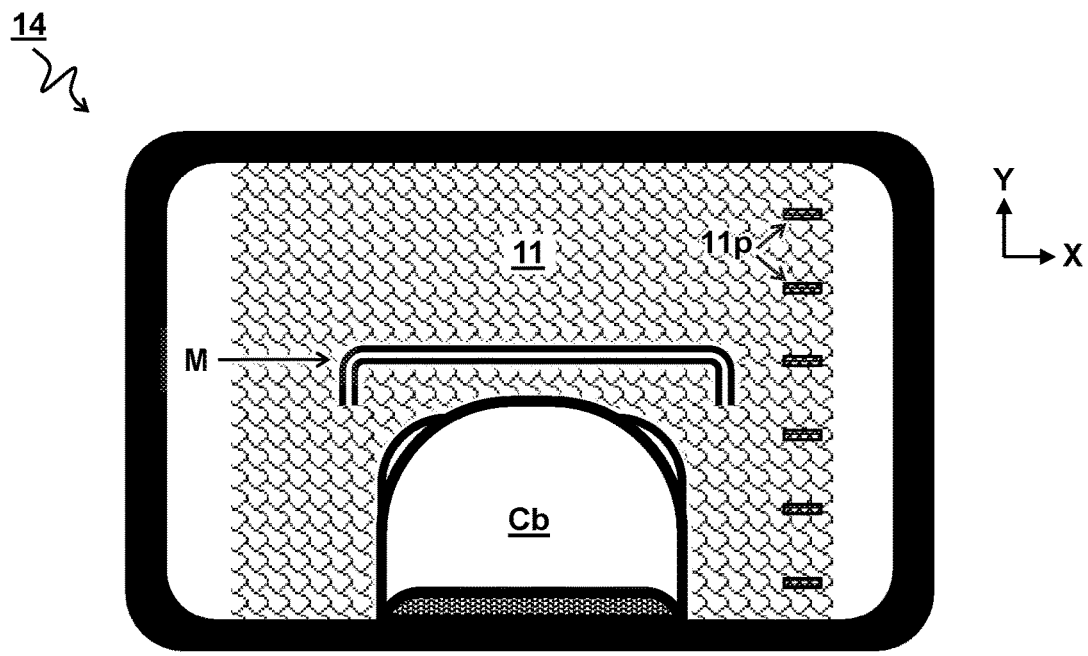
FIG. 1B shows a schematic view of a display screen for use in the system of the first embodiment.

FIG. 1A shows a schematic side view of first embodiment of an automobile factory planning system 100. FIG. 1B shows a schematic view of a display screen 14 for use in the system of FIG. 1A.

The system 100 is configured to operate at a controlled cycle time Tc. In one embodiment, the cycle time Tc determines an interval wherein consecutive automobiles are to be manufactured. In another or further embodiment, the cycle time Tc is a time interval between subsequent vehicles passing a fixed point along the manufacturing line. For example, the factory comprises a plurality of work stations along the manufacturing path of the conveyor belt 11, wherein each work station is configured to perform a manufacturing step in accordance with the cycle time Tc. In one embodiment, the system comprises an input device (not shown) allowing adjustment of the cycle time Tc.

The system 100 comprises a conveyor belt 11. In the embodiment shown, the conveyor belt 11 is an endless belt. Typically the conveyor belt for use in a car factory is very long. For example, the conveyor belt 11 has a one way length of more than sixty metres. For example, the one way length is between a hundred and two hundred metres. The system may optionally comprise a slack adjustment device for compensating length change in the conveyor belt 11 (not shown). The conveyor belt 11 is also typically wide enough to place a car and possibly personnel next to the car. Accordingly, the conveyor belt is usually wider than two metres, e.g. between three and five metres. Preferably, the conveyor belt 11 comprises modular conveyor mats (not shown) which are found particularly advantageous for use in the systems and methods described herein.

The conveyor belt 11 is configured to transport a plurality of automobiles Ca, Cb at a controlled displacement velocity Vc along a manufacturing path through the automobile factory. In one embodiment, a controller 12 is configured to set and/or measure a displacement velocity Vc of the conveyor belt 11. For example, a drive train 13 is configured to drive the displacement of the conveyor belt 11 with the automobiles Ca,Cb at the controlled displacement velocity Vc under control of the controller 12. In one embodiment, the displacement of the conveyor belt is tracked by calibrating the setting of the displacement velocity Vc in the drive train 13.

The system comprises a feedback device configured to provide a visual indicator M of a designated position Pb at which a next automobile Cb is to be placed on the conveyor belt 11. For example, the designated position Pb position can be relative to the position Pa of a previous automobile Ca. The visual indicator M is a virtual indicator in that it is not physically linked (attached or painted) to the conveyor belt 11. The designated position Pb can be calculated as a function of the cycle time Tc and the displacement velocity Vc of the conveyor belt 11. While visible indicators are preferred, alternatively, or in addition also other types of virtual indicators can be used, e.g. audio or haptic feedback. In one embodiment, the controller 12 is configured to calculate displacement of the designated position Pb in sync with the displacement of the conveyor belt 11. In one embodiment, the controller and/or feedback device is configured to provide the position of the visual indicator M as a function of an adjustable cycle time Tc.

In one embodiment, the feedback device comprises a display screen 14 configured to display the visual indicator M in relation to a position of the next automobile Cb. In one embodiment, the controller 12 is configured to control the display screen 14. Preferably, the feedback device is positioned at a beginning of the conveyor belt 11. For example, the system comprises a ramp providing entry of the next automobile Cb at the beginning of the conveyor belt 11. It will be appreciated that the present embodiments provide particular benefit in an automobile factory configured for manual placement of the automobiles Ca, Cb onto the conveyor belt 11, i.e. wherein the vehicles are not automatically placed.

In one embodiment, the feedback device comprises a camera 15 for recording an image including the next automobile Cb. In one embodiment, the visual indicator M is overlaid on the display screen 14 with the recorded image including the next automobile Cb. For example, the overlaid visual indicator M moves on the display screen 14 in sync with an image of the moving conveyor belt 11. Alternatively, or in addition, the camera moves to keep the indicator M at a fixed position on the screen 14. In the embodiment shown, the controller is configured to receive the recorded image from the camera 15 and project the recorded image onto the display screen 14 together with the calculated visual indicator M. In one embodiment, the camera 15 is configured to additionally determine an integrity of the conveyor belt 11 by visual inspection and comparison.

In one embodiment, the visual indicator M comprises a line pattern overlaid on an image of the conveyor belt 11 at the designated position Pb of the next automobile Cb in accordance with the cycle time Tc. In another or further embodiment, a length of the visual indicator M extends in a direction X transverse to the displacement velocity Vc of the conveyor belt 11. In another or further embodiment, the length of the line pattern is shorter than a width of the imaged conveyor belt 11, wherein a position of the line pattern relative the imaged conveyor belt 11 determines a centre position of the next automobile Cb on the conveyor belt 11. For example, the visual indicator M comprises a width indicator to determine a centre position of the next automobile Cb. In one embodiment, the width indicator is adjustable depending on a width of the next automobile Cb In the embodiment shown, the camera 15 is positioned to record a top view image of the conveyor belt 11 and the next automobile Cb. Of course, the camera could also be positioned elsewhere, e.g. to record a perspective or side view image of the car. The conveyor belt and/or the car Cb are not necessarily shown on the display. For example, a representative picture can be shown, or simply the distance to the designated position.

In one embodiment, the system comprises a tracking sensor configured to track displacement of the conveyor belt 11. For example, the tracking sensor is configured to measure a rotation of rollers supporting the conveyor belt 11. In one embodiment, the system comprises the same or another tracking sensor configured to track a position Z of the next automobile Cb on the conveyor belt 11. In one embodiment, the camera 15 functions as a tracking sensor for tracking the displacement of the conveyor belt 11. For example as shown, the conveyor belt 11 comprises a tracking pattern 11p painted along a length Y of the conveyor belt 11 for tracking a displacement of the conveyor belt 11 by a camera 15. Even if a distance between the tracking pattern 11p changes as a result of lengthening of the conveyor belt 11, still the displacement velocity remains true and can be tracked by the sensor or camera.

Selections or combinations of the features described herein can provide further advantageous synergy. For example, a preferred embodiment of a feedback device comprises one or more of the following components. A clock configured to provide a periodic or controlled cycle time Tc; a displacement sensor configured to set and/or measure a displacement velocity Vc of a conveyor belt 11; a controller configured to calculate a designated position Pb of a next automobile Cb as a function of the cycle time Tc and the displacement velocity Vc of the conveyor belt 11; a camera 15 configured to record an image including the next automobile Cb on the conveyor belt 11; and a display screen 14 configured to display a visual indicator M of the designated position Pb at which the automobile Cb is to be placed on the conveyor belt 11 according to the cycle time Tc wherein the visual indicator M is overlaid on the display screen 14 with the recorded image including the next automobile Cb. Of course, components can be combined, e.g. the clock can be integrated in the controller. The function of the displacement sensor can also be performed e.g. by setting a predetermined displacement velocity using the drive train 13.

The figure is also illustrative of a method for controlling a cycle time Tc in an automobile factory. The method comprising transporting a plurality of automobiles Ca, Cb at a controlled displacement velocity Vc along a manufacturing path through the automobile factory. The method further comprises providing a visual indicator M of a designated position Pb at which a next automobile Cb is to be placed on the conveyor belt 11 relative to the position Pa of a previous automobile Ca, wherein the designated position Pb is calculated as a function of the cycle time Tc and the displacement velocity Vc of the conveyor belt 11.

The method can also be embodied for example as a non-transitory computer readable medium storing program instructions for causing an automobile factory planning system 100 to execute the method.

Figure 2A:
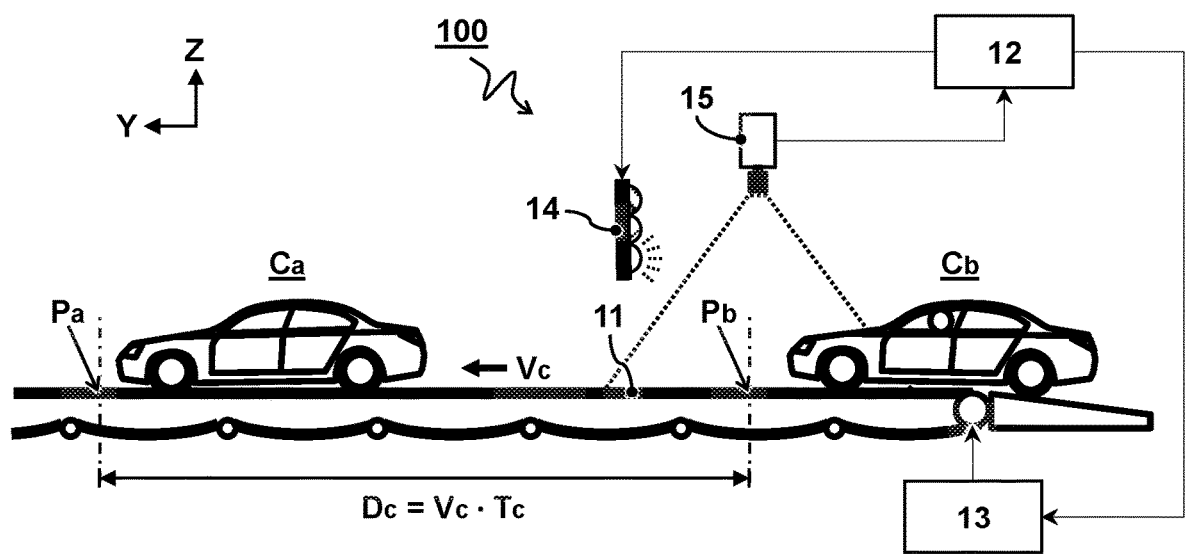
FIG. 2A shows a schematic side view of second embodiment of an automobile factory planning system.
Figure 2B:
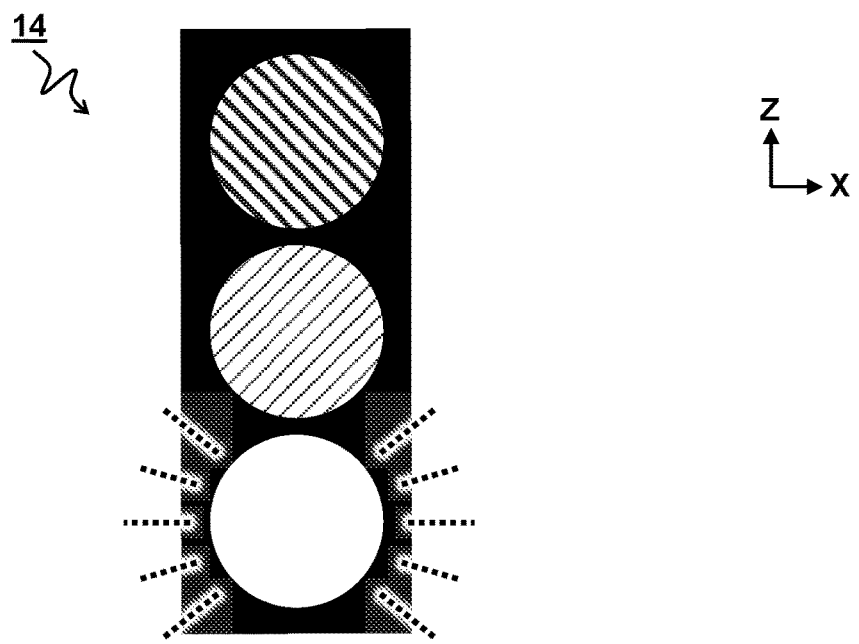
FIG. 2B shows a schematic view of a traffic light for use in the system of the second embodiment.

FIG. 2A shows a schematic side view of second embodiment of an automobile factory planning system 100. FIG. 2B shows a schematic view of a traffic light 14 for use in the system of FIG. 2A.

The second embodiment is similar as the first embodiment, described with reference to FIG. 1, but using a traffic light instead of a display screen. For example, the lighting is controlled as a function of a distance between an actual position of the next automobile Cb relative to its designated position Pb on the moving conveyor belt 11. For example, a green light means that the car can still move forward, while a red light means the car must stop. It is noted that the present system differs from other applications of a traffic light in that the designated position is not fixed but moves with the conveyor belt as a function of the displacement velocity Vc and cycle time Tc.

Since the image of the car Cb is not displayed in this embodiment, a camera 15 is not necessary but can nevertheless be used e.g. to track the position of the car relative to the designated position Pb. Movement of the designated position Pb according to the displacement velocity Vc of the conveyor belt 11 can also be tracked by the camera. Instead of a camera also other sensors can be used to track the relative position of the car with respect to the designated position Pb.

Figure 3A:
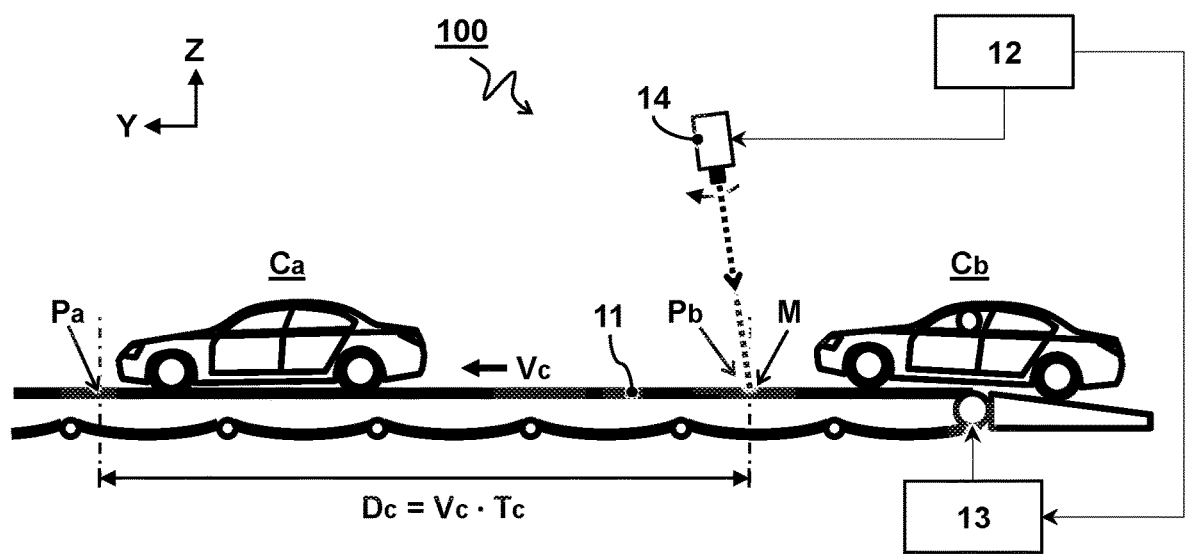
FIG. 3A shows a schematic side view of third embodiment of an automobile factory planning system.
Figure 3B:
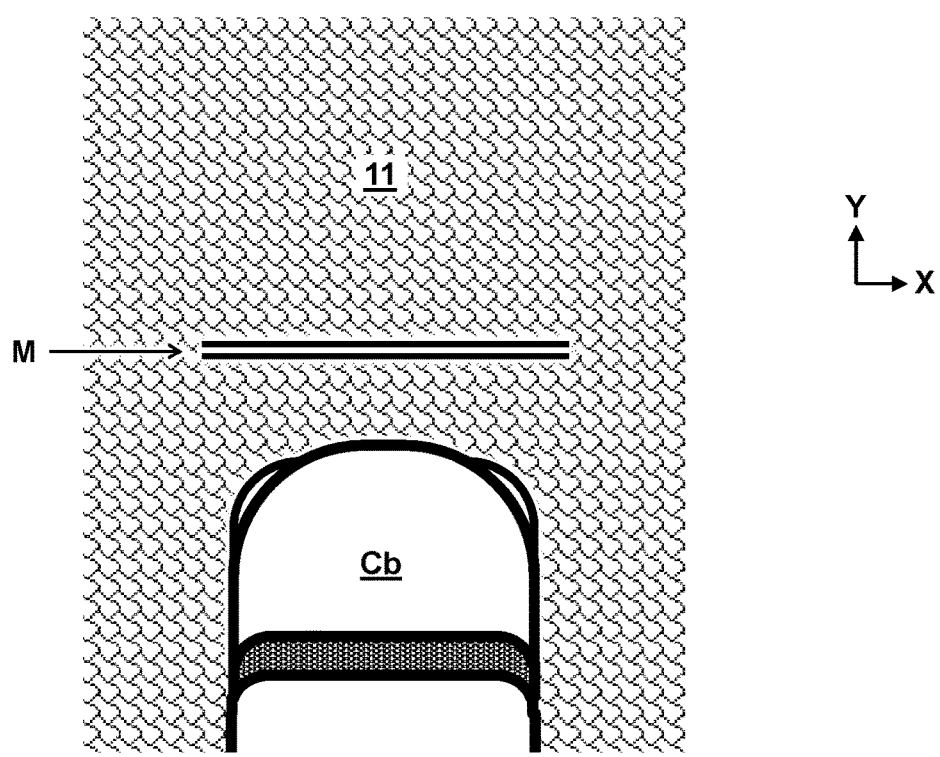
FIG. 3B shows a schematic top view of a projected virtual marking in the system of the third embodiment.

FIG. 3A shows a schematic side view of third embodiment of an automobile factory planning system. FIG. 3B shows a schematic top view of a projected virtual marking M in the system of FIG. 3A.

In the embodiment shown, the feedback device comprises a light projector configured to project the visual indicator M onto the conveyor belt 11 moving in sync with the displacement velocity Vc of the conveyor belt 11. More particularly, for example, the feedback device comprises a laser system configured to project the visual indicator M as a laser pattern onto the conveyor belt 11 moving in sync with the displacement velocity Vc of the conveyor belt 11.

For the purpose of clarity and a concise description, features are described herein as part of the same or separate embodiments, however, it will be appreciated that the scope of the invention may include embodiments having combinations of all or some of the features described. For example, while embodiments were shown for providing feedback using visual indicators, also alternative ways may be envisaged by those skilled in the art having the benefit of the present disclosure for achieving a similar function and result. For example, in one embodiment, the feedback device alternatively or additionally comprises an audio device configured to generate an audio signal whose pitch and/or volume is controlled as a function of a distance between an actual position of the next automobile relative to its designated position on the moving conveyor belt. Also haptic feedback can be used alternatively, or additionally. Visual feedback with regards to the positioning of the car can also be provided e.g. on a mobile device. Functional components may be combined or split up into one or more alternative components. The various elements of the embodiments as discussed and shown offer certain advantages, such as improved control over positioning of cars on a conveyor belt. Of course, it is to be appreciated that any one of the above embodiments or processes may be combined with one or more other embodiments or processes to provide even further improvements in finding and matching designs and advantages. It is appreciated that this disclosure offers particular advantages to the automobile industry, and in general can be applied for any application wherein heavy equipment is manually placed on a moving surface according to a specific time schedule.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. An automobile factory planning system configured to operate at a controlled cycle time, the system comprising a conveyor belt configured to transport a plurality of automobiles at a controlled displacement velocity along a manufacturing path through the automobile factory; a display screen configured to provide a visual indicator providing feedback of a designated position at which an automobile is to be placed on the conveyor belt to a driver of the automobile, wherein the designated position is calculated as a function of the cycle time and the displacement velocity of the conveyor belt such that a displacement of the designated position is in sync with a displacement of the conveyor belt; and a camera for recording an image including the automobile, wherein the visual indicator is overlaid on the display screen with the recorded image including the automobile, wherein the visual indicator comprises a line pattern, wherein a length of the line pattern extends in a direction transverse to the displacement velocity of the conveyor belt, and wherein a position of the line pattern relative to the imaged conveyor belt indicates a centre position of the automobile on the conveyor belt.

2. The system according to claim 1, comprising a controller configured to set and/or measure the displacement velocity of the conveyor belt and calculate the displacement of the designated position in sync with the displacement of the conveyor belt.

3. The system according to claim 2, wherein the conveyor belt comprises a tracking pattern along a length of the conveyor belt for tracking a displacement of the conveyor belt by the camera.

4. The system according to claim 3, wherein the conveyor belt comprises a modular conveyor mat.

5. The system according to claim 1, wherein the system is configured to provide the position of the visual indicator moving on the display screen as a function of the cycle time.

6. The system according to claim 1, wherein the display screen is configured to display the visual indicator in relation to a position of the automobile.

7. The system according to claim 1, wherein the conveyor belt comprises a tracking pattern along a length of the conveyor belt for tracking a displacement of the conveyor belt by the camera.

8. The system according to claim 1, further comprising a plurality of work stations along the manufacturing path of the conveyor belt, wherein each work station is configured to perform a manufacturing step in accordance with the cycle time.

9. The system according to claim 1, wherein the automobile factory is configured for manual placement of the automobiles onto the conveyor belt.

10. The system according to claim 1, further comprising a ramp providing entry of the automobile at a beginning of the conveyor belt, and the display screen is positioned at the beginning of the conveyor belt such that the indicator is viewable to the driver placing the automobile on the conveyor belt.

11. The system according to claim 1, wherein the conveyor belt comprises a modular conveyor mat.

12. The system according to claim 1, comprising an input device allowing adjustment of the cycle time.

13. A feedback device for maintaining a cycle time in an automobile factory planning system having a conveyor belt configured to transport a plurality of automobiles at a controlled displacement velocity along a manufacturing path, the feedback device comprising:
a clock configured to provide a periodic cycle time;
a sensor configured to set and/or measure a displacement velocity of a conveyor belt;
a controller configured to calculate a designated position of an automobile as a function of the cycle time and the displacement velocity of the conveyor belt;
a camera configured to record an image including the automobile on the conveyor belt; and
a display screen configured to display a visual indicator of the designated position at which the automobile is to be placed on the conveyor belt according to the cycle time, wherein the visual indicator is overlaid on the display screen with the recorded image including the automobile, wherein the visual indicator comprises a line pattern, wherein a length of the line pattern extends in a direction transverse to the displacement velocity of the conveyor belt, and wherein a position of the line pattern relative to the imaged conveyor belt indicates a centre position of the automobile on the conveyor belt.

14. A method for controlling a cycle time in an automobile factory transporting a plurality of automobiles using a conveyor belt at a controlled displacement velocity along a manufacturing path through the automobile factory, comprising the step of providing a visual indicator of a designated position at which an automobile is to be placed on the conveyor belt, wherein the designated position is calculated as a function of the cycle time and the displacement velocity of the conveyor belt, and wherein the visual indicator is provided by a display screen overlaying the visual indicator with an image including the automobile, wherein the visual indicator comprises a line pattern, wherein a length of the line pattern extends in a direction transverse to the displacement velocity of the conveyor belt, and wherein a position of the line pattern relative to the imaged conveyor belt indicates a centre position of the automobile on the conveyor belt.

15. The method according to claim 14, wherein the step of providing is performed by a single controller.

16. A method for placing an automobile on a conveyor belt that is moving at a controlled displacement velocity along a manufacturing path through an automobile factory in accordance with a cycle time of the automobile factory, the method comprising the step of providing a visual indicator of a designated position at which an automobile is to be placed on the conveyor belt, wherein the designated position is calculated as a function of the cycle time and the displacement velocity of the conveyor belt, wherein the automobile is placed at the designated position aided by the visual indicator as feedback, and wherein the visual indicator is provided by a display screen overlaying the visual indicator with an image including the automobile, wherein the visual indicator comprises a line pattern, wherein a length of the line pattern extends in a direction transverse to the displacement velocity of the conveyor belt, and wherein a position of the line pattern relative to the imaged conveyor belt indicates a centre position of the automobile on the conveyor belt.

* * * * *